United States Patent
Kärkkäinen

(10) Patent No.: US 8,168,740 B2
(45) Date of Patent: May 1, 2012

(54) PROCESS FOR PRODUCING AN ORGANSILOXANE POLYMER

(75) Inventor: Ari Kärkkäinen, Oulu (FI)

(73) Assignee: Braggone Oy, Oulu (FI)

( * ) Notice: Subject to any disclaimer, the term of this patent is extended or adjusted under 35 U.S.C. 154(b) by 57 days.

(21) Appl. No.: 12/528,669

(22) PCT Filed: Feb. 26, 2008

(86) PCT No.: PCT/FI2008/050092
§ 371 (c)(1), (2), (4) Date: Sep. 25, 2009

(87) PCT Pub. No.: WO2008/104641
PCT Pub. Date: Sep. 4, 2008

(65) Prior Publication Data
US 2010/0016488 A1    Jan. 21, 2010

Related U.S. Application Data

(60) Provisional application No. 60/891,832, filed on Feb. 27, 2007.

(51) Int. Cl.
  C08G 77/00   (2006.01)
  C08G 77/04   (2006.01)
  C08G 77/06   (2006.01)
(52) U.S. Cl. .................. 528/39; 528/10; 528/12
(58) Field of Classification Search .................... 524/391
  See application file for complete search history.

(56) References Cited

U.S. PATENT DOCUMENTS

| | | | |
|---|---|---|---|
| 5,932,676 A * | 8/1999 | Taguchi et al. | 528/12 |
| 6,448,331 B1 * | 9/2002 | Ioka et al. | 524/859 |
| 2004/0028915 A1 * | 2/2004 | Shibuya et al. | 428/447 |
| 2004/0238901 A1 * | 12/2004 | Balkenende et al. | 257/406 |
| 2005/0113472 A1 * | 5/2005 | Fillmore et al. | 521/50.5 |
| 2005/0196974 A1 * | 9/2005 | Weigel et al. | 438/780 |
| 2005/0245717 A1 | 11/2005 | Kennedy et al. | |
| 2005/0277756 A1 | 12/2005 | Iwabuchi et al. | |
| 2006/0024980 A1 * | 2/2006 | Tsuchiya et al. | 438/789 |
| 2006/0046078 A1 | 3/2006 | Richter et al. | |
| 2006/0287460 A1 * | 12/2006 | Tani et al. | 528/28 |
| 2008/0260956 A1 | 10/2008 | Sakurai et al. | |
| 2009/0061199 A1 * | 3/2009 | Egami et al. | 428/304.4 |

FOREIGN PATENT DOCUMENTS

| | | |
|---|---|---|
| EP | 1829945 A1 | 5/2007 |
| WO | WO 2004044025 A2 * | 5/2004 |
| WO | 2006068181 A1 | 6/2006 |
| WO | 2007021965 A2 | 2/2007 |
| WO | 2008102060 A2 | 8/2008 |
| WO | WO 2008104641 A2 * | 9/2008 |

* cited by examiner

*Primary Examiner* — Robert Loewe
(74) *Attorney, Agent, or Firm* — McCormick, Paulding & Huber LLP

(57) ABSTRACT

Process for producing an organosiloxane polymer and novel organosiloxane polymer compositions. The process according to the invention comprises hydrolyzing tetraalkoxysilane monomers in a hydrolysis step; and polymerizing said hydrolyzed monomers in a polymerization step by subjecting them to conditions conducive to polymerization to form an organosiloxane polymer. The hydrolysis step is conducted in a reaction medium comprising an organic compound with hydroxy groups. The invention allows for the synthesis of siloxane polymer compositions suitable for thin-film applications using a high content of tetra- and trifunctional silixane polymer precursors.

23 Claims, No Drawings

PROCESS FOR PRODUCING AN ORGANSILOXANE POLYMER

CROSS REFERENCE TO RELATED APPLICATIONS

This application is entitled to the benefit of and incorporates by reference essential subject matter disclosed in International Patent Application No. PCT/FI2008/050092 filed on Feb. 26, 2008 and U.S. Provisional Application No. 60/891,832 filed Feb. 27, 2007.

BACKGROUND OF THE INVENTION

1. Field of the Invention

The present invention relates to organosiloxane polymers suitable for thin film applications. In particular, the invention concerns a novel process for producing high-silicon content organosiloxane polymers for thin film applications and to compositions containing such polymers.

2. Description of Related Art

There is a constant demand for decreasing the size of various features in semiconductor devices, e.g. integrated circuits (ICs). This demand creates challenges for the manufacturing processes. Photolithography is an example of a technique commonly used for the production of such devices and in particular for creating the patterns that define structures in ICs. In a lithographic process, a layer of a photoresist material is deposited on a substrate. The photoresist layer is selectively exposed to radiation, such as ultraviolet-light or electrons, and an exposure tool and mask are used for producing the desired selective exposure. The patterns in the resist are then created when the wafer undergoes a subsequent "development" step. The areas of resist that remain after development serve to protect the substrate regions which they cover. Locations from which resist has been removed can be subjected to a variety of subtractive or additive processes that transfer the pattern onto the substrate surface.

Usually, siloxane polymers for use in, e.g. spin-on applications are provided in the form of liquid composition containing the polymer having a modest degree of polymerization, for example a prepolymer having a molecular weight of about 1,000 to 10,000 g/mol, dissolved or suspended in an organic solvent.

The method by which the polymer is produced has an impact on the properties of the organosiloxane polymer, in particular on the use of the polymer composition for the production of thin films. Generally, a failure in the synthesis procedure will lead to a drastic reduction in the deposited film quality. Thus, to mention an example, high silixon dioxide content materials can be produced from tri- and tetraalkoxysilane monomers. However, these monomers readily produce high-molecular weight polymers that have a tendency of gelling during film formation or even during storage.

Therefore, there is a need for improving the synthesis methods of, in particular, high silicon dioxide materials to provide organosiloxane polymer compositions that give rise to high-quality thin films.

SUMMARY OF THE INVENTION

It is an aim of the present invention to provide an improved method of producing an organosiloxane polymer.

It is a further aim of the invention to provide an organosiloxane polymer composition.

It is a third aim of the present invention to provide uses of compositions produced by the present invention and of the novel compositions.

In connection with the present invention it has been found that during the synthesis of organosiloxane polymers, in particular during the hydrolysis steps, and potentially also the condensation polymerization steps, the reactions of the silane precursors are influenced by the solvents used as reaction medium. In particular, it has been found that it is possible to control the reactions by incorporating solvents capable of interacting with the precursors or with the hydrolyzed monomers or of the polymerized molecules or combinations thereof. Examples of such solvents are organic compounds containing hydroxyl groups. It has further been found that hydroxyl compounds have particularly beneficial influence on the film-forming properties of organosiloxane compositions obtained by hydrolysis and condensation polymerization of silane precursors at least 50 mole-% of which are comprised of silane monomers containing three or four alkoxy groups.

The present invention therefore comprises a process for producing an organosiloxane polymer comprising the steps of hydrolyzing silicon monomers, polymerising said monomers by subjecting them to conditions conducive to condensation polymerisation to form an organosiloxane polymer, and recoving said organosiloxane polymer, wherein the step of hydrolyzing the monomers is conducted in a reaction medium comprising an organic compound with hydroxyl groups.

Further, it has been found that organosiloxane polymers can be formulated into thin-film forming compositions which contain a significant amount of an organic solvent with hydroxyl groups and which exhibit a high solids content (evaporation residue) and where the organosiloxane polymer has a high silicon content.

More specifically, the present process is characterized by what is stated in the characterizing part of claim 1.

The composition according to the present invention is characterized by what is stated in the characterizing part of claim.

The invention provides considerable advantages. Thus, the synthesis method described in the present invention makes it possible to synthesize siloxane polymer compositions that would under usual hydrolysis and condensation polymerization conditions result in material that would not be possible to be process able through the liquid phase deposition techniques. The method described allows for the use of a high content of tetra- and trifunctional silixane polymer precursors.

The various applications of the invention will be examined below. Summarizing, it can here be noted that the present coating (film-forming) compositions according to the invention can be used for forming an optical or electrical thin film coating on a substrate, for forming anti-reflection coatings, for forming a chemical and dry etching stop layer in lithographic processing, for forming a protective coating in an organic light emitting device, and for forming an efficiency enhancing layer in a solar cell. Further, the invention can be used for forming a high index material in an optical thin film filter and for forming an optical diffractive grating and a hybrid thin film diffractive grating by embossing, holography lithography and nano-imprinting of the thin film.

Next the invention will be examined more closely with the aid of a detailed description and a number of working examples.

DETAILED DESCRIPTION OF PREFERRED EMBODIMENT

As discussed above, according to one aspect, the present invention is based on the finding that by incorporating an organic compound containing hydroxyl groups, capable of interacting with the hydrolyzing monomers, it is possible to influence the chemical character of the polymer formed by condensation.

According to one particularly preferred embodiment, the content of trifunctional or, preferably, tetra-functional alkoxide (alkoxysilane) residues in the polymer is at least 50 mole-%, preferably at least 60 mole-% and in particular at least 70 mole-% or even higher. These residues can be derived from, e.g. tri(lower alkoxy)silanes or tetra(lower alkoxy)silanes, such as ethoxysilane or tetramethoxysilane or mixtures thereof. By using a large portion of these compounds, the silicon dioxide content of the final deposited film can be maximized. Naturally, it is also possible to use precursors, i.e. silane monomers having organic functionalities, in the precursor procedure.

Generally the synthesis of the siloxane polymer composition consists of two steps: In the first synthesis step (in the following also called the hydrolysis step) the precursor molecules are hydrolyzed in presence of water and a catalyst, such as hydrochloric acid or another mineral or organic acid, and in the second step (the polymerization step), the molecular weight of the material is increased by condensation polymerization.

The water used in the hydrolysis step has typically a pH of less than 7, preferably less than 6, in particular less than 5.

The synthesis is carried out in a synthesis solvent or a mixture of solvents.

As discussed above, the solvent or solvent mixtures employed has/have an impact on the hydrolysis and condensation reactions during the synthesis. The solvents can roughly be characterized as being inert (or inactive) and active solvents with respect to their interaction with the hydrolysis and polymerisation reactions, respectively.

According to one embodiment, the reaction medium of the hydrolysis step comprises 5 to 95 mole-%, preferably 10 to 80 mole-%, of the organic compound containing hydroxyl groups, and 95 to 5 mole-%, in particular 90 to 20 mole-% of water.

The reaction medium of the hydrolysis step may comprise also a second organic solvent (the organic compound with hydroxyl groups being the "first" organic solvent). This second organic solvent is selected from the group of aliphatic and aromatic hydrocarbons, aliphatic or aromatic ethers, aliphatic or aromatic esters and mixtures thereof.

According to a preferred embodiment, the reaction medium comprises 5 to 90 mole-%, in particular about 20 to 80 mole-% and in particular about 40 to 75 mole-% of a second organic solvent. A particularly preferred embodiment provides for the use of a reaction medium which comprises at least 50 mole-% of the second organic solvent, a minimum of 10 mole-% of the organic hydroxyl compound and a minimum of 10 mole-% water.

Typically, the second organic solvent is capable of dissolving the hydrolyzed monomer.

The organic hydroxy compound and the first organic solvent are miscible with each other.

The organic hydroxy compound is preferably an alcohol having the formula $R^5$—OH wherein $R^5$ stands for
a linear or branched or cyclic alkyl having 1 to 10 carbon atoms, said alkyl optionally being substituted with one or several hydroxy groups, halogen groups, thiol groups, carboxylic acid groups, and aryl groups; or
an aryl group having 6 to 12 carbon atoms, which aryl group is optionally substituted with one or several hydroxy groups, halogen groups, thiol groups, carboxylic acid groups, and aryl groups.

In particular, the organic hydroxyl compound is selected from the group of primary, secondary and tertiary alcohols. Typical examples are methanol, ethanol, propanol, isopropanol, n-butanol, tert-butanol, amyl alcohol, as well as bifunctional alcohols (diols) such as ethanodiol (ethelene glycol), propandiol (propylene glycol) and derivatives thereof.

There can be a mixture of water and an alcohol, the weight ratio of water-to-alcohol being about 5:95 to 95:5, preferably about 10:90 to 90:10, in particular 20:80 to 80:20.

Based on the above, suitable solvents for the synthesis are, for example, acetone, tetrahydrofuran (THF), toluene, 2-propanol, methanol, ethanol, propylene glycol monomethyl ether, propylene glycol propyl ether, methyl-tert-butylether (MTBE), propyleneglycolmonomethylether acetate (PGMEA), propyleneglycolmonomethylether PGME and propylene glycol propyl ether (PnP).

In the first synthesis step, the precursor, water, catalyst, synthesis solvent(s) mixture are refluxed for 0.1 to 24 hours, generally about 0.2 to 15 hours, in particular about 1-5 hours. After this time, the synthesis solvent(s), water and other by-products, such as alcohols, are removed. This is performed by distillation.

If inert synthesis solvents such as acetone are used during hydrolysis (cf. Example 1) and when the intermediate product is completely dried by distillation, i.e. when all solvents and by-product and water are removed, it is not readily possible to dissolve the material in any of the processing solvents. This is typically the case with high silicon content compositions (high concentration of tetraalkoxy silane monomers in the reaction mixture). Accordingly, in a preferred embodiment, solvent exchange is carried out during the process (cf. Example 2). In such a solvent exchange step, the second organic solvent is changed for a third organic solvent which has a higher boiling point that the second. Thus, acetone can be change for PGMEA, PGME, or PnP, to mention some examples.

A further preferred embodiment comprises the use of active solvent during the synthesis. This results usually in a composition that can be dried to dryness by using distillation and then easily redissolved aging to a processing or further synthesis solvent.

In the second synthesis step, i.e. the condensation polymerization step, the material is further refluxed in a solvent or a solvent, preferably having a higher boiling point than the solvent or solvent mixture used for hydrolysis for a reaction time of approx. 0.1 to 24 hours, preferably 0.2 to 15 hours, in particular about 1-5 hours. During the second synthesis step, the molecular weight of the material is increased due to condensation polymerization. Conventionally, the average molecular weight of the polymer is about 500 to 50,000 g/mol, in particular about 1,000 to 10,000 g/mol, preferably about 2,000 to 8,000 g/mol, and advantageously about 3,000 to 6,000 g/mol, although these are no absolute limits.

After the second step, the reaction by-products, such as water and alcohols, may be removed using distillation. Also the used higher boiling point solvent(s) can be changed to another solvent that is required to be used in the deposition process. Mixtures of two or more solvents can also be used as processing solvent.

During the synthesis it is possible to use certain stabilizer solvents or additives or they can be added at the end of the synthesis to the final synthesized material to improve material shelf-life.

As will appear from the above, the organic hydroxy compound is preferably present both during the hydrolysis and the polymerization of the monomer.

After synthesis, the organosiloxane polymer can be recovered in the reaction medium.

The synthesized material is then diluted using a proper solvent or solvent combination to result in desirable film thickness. According to a preferred embodiment, the organosiloxane polymer is formulated into a composition comprising at least about 20 mole-% of an organic hydroxyl compound.

Film thicknesses may range e.g. from 5 nm to 10 μm. Various methods of producing thin films are described in U.S. Pat. No. 7,094,709, the contents of which are herewith incorporated by reference.

In the above process, various silane monomers, and in particular combinations of silane monomers, can be used as precursors of the present organosiloxane polymers.

According to one embodiment, the process according to the invention comprises hydrolyzing and polymerizing a monomer according to either or both of formulas I and II:

   I and

   II wherein $R^1$ and $R^2$ are independently selected from the group consisting of hydrogen, linear and branched alkyl and cycloalkyl, alkenyl, alkynyl, (alk)acrylate, epoxy and alkoxy and aryl having 1 to 6 rings;
each X represents independently a hydrolysable group or a hydrocarbon residue; and
a and b is an integer 1 to 3.

Further, in combination with monomers of formula I or II or as such at least one monomer corresponding to Formula III can be employed:

   III wherein $R^3$ stands for hydrogen, alkyl or cycloalkyl which optionally carries one or several substituents, or alkoxy;
each X represents independently a hydrolysable group or a hydrocarbon residue having the same meaning as above; and
c is an integer 1 to 3.

In any of the formulas above, the hydrolysable group is in particular an alkoxy group (cf. formula IV).

As discussed above, the present invention provides for the production of organosiloxane polymers using tri- or tetraalkoxysilane as the predominant monomer, said tri- or tetraalkoxysilane making up at least 60 mole-%, in particular at least 70 mole-%, suitably at least 80 mole-% (even up to 100 mole-%) of the total amount of monomers. The alkoxy groups of the silane can be identical or different and preferably selected from the group of radicals having the formula

   IV wherein $R^4$ stands for a linear or branched alkyl group having 1 to 10, preferably 1 to 6 carbon atoms, and optionally exhibiting one or two substitutents selected from the group of halogen, hydroxyl, vinyl, epoxy and allyl.

Particularly suitable monomers are selected from the group of triethoxysilane, tetraethoxysilane, methyltriethoxysilane, ethyltriethoxysilane, n-butyltriethoxysilane, methyldiethoxyvinylsilane, dimethyldiethoxysilane, phenyltrimethoxysilane, and phenantrene-9-triethoxysilane and mixtures thereof.

According to one embodiment, at least 50 mole-% of the monomers being selected from the group of tetraethoxysilane, methyltriethoxysilane, ethyltriethoxysilane, n-butyltriethoxysilane, methyldiethoxyvinylsilane and dimethyldiethoxysilane and mixtures thereof.

The final anti-reflective coating film thickness has to be optimized according for each device fabrication process. When using, for example, when PGMEA is employed as solvent for the synthesis, in one or both of the above-described the synthesis steps, it is not necessary to change the solvent for the final material, since PGMEA is regularly used also as a processing solvent in the semiconductor industry. This makes the synthesis procedure of the material easier and less time consuming.

The present invention provides novel organosiloxane polymer composition, comprising
an organosiloxane polymer formed by a partially cross-linked siloxane backbone comprising residues derived from tetraalkoxysilane monomers, said residues making up at least 50 mole-% of the siloxane backbone; and
a solvent mixture, comprising at least 30 mole-% of an organic hydroxyl compound.

The siloxane is partially cross-linked, the average molecular weight being about 500 to 50,000 g/mol, in particular about 1,000 to 10,000 g/mol, preferably about 2,000 to 8,000 g/mol, and advantageously about 3,000 to 6,000 g/mol.

According to one embodiment, the solvent mixture is essentially non-aqueous.

The solids concentration of the composition is at least 15 weight-%. Further it is preferred that the organosiloxane polymer contains at least 60 mole-%, in particular at least 70 mole-%, residues derived from tetraalkoxysilane monomers.

The other components of the solvent mixture can be the same as above. According to an interesting embodiment, the solvent mixture comprises at least 30 mole-%, preferably 30 to 75 mole-% of an alcohol or similar hydroxyl compound and 70 to 25 mole-% of at least one other organic solvent selected from the group of aliphatic and aromatic hydrocarbons, aliphatic or aromatic ethers, aliphatic or aromatic esters and mixtures thereof.

As briefly discussed above, the present materials have a great number of interesting new applications. Examples include:
A. Optical and electrical coatings
B. High dielectric constant (high-k) gate oxides and interlayer high-k dielectrics
C. ARC (anti-reflection) coatings
D. Etch and CMP stop layers
E. Protection and sealing (OLED etc.)
F. Organic solar cells
G. Optical thin film filters
H. Optical diffractive gratings and hybrid thin film diffractive grating structures
I. High refractive index abrasion resistant coatings
The following examples will elucidate the invention:

EXAMPLE 1

Tetraethoxysilane (300.00 g, 100 mol %) was weighed to a round bottom flask. 300.0 g of (Propyleneglycol monomethyl ether) PGME was added to the round bottom flask. 103.68 g of water (0.01 M HCl) was added to the reaction flask within 5 min, while constantly stirring the reaction mixture using a magnetic stirrer. After this the reaction mixture was stirred at RT for 15 min and refluxed for 5 hours using electric mantel. After refluxing a solvent exchange procedure was performed (206 g of PGME was added). After the solvent exchange the material solution was refluxed at 120 C for 2 hours. After the 2 hour refluxing step the material is ready to use after dilution and filtration. The material was diluted (by adding PGME) to 20% solid content and filtrated using 0.1 µm PTFE filter.

As can be seen from the above example this composition is synthesized by using only tetraethoxysilane as precursor molecule in the synthesis process of the polymer. This composition will result in very high silicon content in the final material. This can be calculated as theoretical silicon content (%) value. The calculation is based on the atom weights of the final compositions. As an example, for pure $SiO_2$ the silicon content is 46.7% (28.09/60.09*100%=46.7%). If triethoxysilane is used as starting material even higher silicon content value can be achieved. If the synthesis is done for example in an inert solvent, such as acetone, and all the solvent is evaporated away after the 5 h hydrolysis the material would not possibly anymore to be dissolved in any solvent.

So one way to prevent this to use solvent exchange procedure to example PGMEA or PGME as illustrated in the following examples. This way we are able to make a working siloxane polymer solution for deposition. Furthermore, it is possible to use an "active" solvent(s) (or solvent mixtures, active or inert solvents) during the synthesis procedure (such as alcohols like isopropanol, PGME, PnP etc.) to control the hydrolysis and condensation reactions. As illustrated in Example 1 PGME is used as synthesis solvent.

After the hydrolysis step it would be possible to evaporate the synthesis solvents completely way and still be able to dissolve the material into a processing solvent to make a material composition for film deposition. Obviously in this case it is possible to use a solvent exchange to change the processing solvent to another solvent such as PGMEA or PnP if it is preferred. The solvent exchange procedure will result in a more repeatable synthesis process.

To modify the composition (silicon content or other physical, optical, mechanical or chemical properties) it is possible to add in organic functionalities bearing precursor molecules in the synthesis. Examples are silanes having aromatic substitutents or other chromophoric substitutents. Furthermore it is possible to use some photoactive functionalities in the precursors that allow one to use thermal or irradiation activated polymerization during processing. Functionalities of this kind include epoxy, vinyl and allyl groups. This includes moieties that allow one to make both positive lithographic tone and negative lithographic tone siloxane polymer compositions.

The example below illustrate some examples of the synthesized compositions. These are just illustrative examples and the present invention is not restricted to these cases that are represented below.

EXAMPLE 2

Phenyltrimethoxysilane (26.03 g, 13 mol %), tetraethoxysilane (119.97 g, 57 mol %) and methyltriethoxysilane (53.98 g, 30 mol %) were weighed to a round bottom flask. 100.0 g of (Propyleneglycol monomethyl ether) PGME was added to the round bottom flask. 64.85 g of water (0.01 M HCl) was added to the reaction flask within 5 min, while constantly stirring the reaction mixture using a magnetic stirrer. After this the reaction mixture was stirred at RT for 27 min and refluxed for 5 hours using electric mantel. After refluxing a solvent exchange procedure was performed from PGME to PGMEA (230 g of PGMEA was added). After the solvent exchange step the material is ready to use after dilution and filtration. The material was diluted (by adding PGMEA) to 20% solid content and filtrated using 0.1 µm PTFE filter.

EXAMPLE 3

Phenyltrimethoxysilane (1.60 g, 5 mol %), tetraethoxysilane (26.81 g, 80 mol %) and Phenanthrene-9-triethoxysilane (8.24 g, 15 mol %) were weighed to a round bottom flask. 73.3 g of acetone was added to the round bottom flask. 10.75 g of water (0.01 M HCl) was added to the reaction flask within 5 min, while constantly stirring the reaction mixture using a magnetic stirrer. After this the reaction mixture was stirred at RT for 27 min and refluxed for 5 hours using electric mantel. After the refluxing, most of the acetone was removed from the reaction mixture using a rotary evaporator (pressure 350->250 mbar, t(bath)=50° C.). After most of the acetone was removed, 72 g of PGMEA was added to the flask. The reaction mixture was evaporated further in the rotary evaporator (pressure 45 mbar, t(bath)=50° C., 1 hour) after PGMEA addition to perform a solvent exchange. After the solvent exchange the material solution was refluxed at 120 C for 2 hours. After the 2 hour refluxing step the material is ready to use after dilution and filtration. The material was diluted (by adding PGMEA) to 20% solid content and filtrated using 0.1 µm PTFE filter.

EXAMPLE 4

Phenyltrimethoxysilane (4.80 g, 5 mol %), tetraethoxysilane (85.47 g, 85 mol %) and Phenanthrene-9-triethoxysilane (16.47 g, 10 mol %) were weighed to a round bottom flask. 213.48 g of acetone was added to the round bottom flask. 33.48 g of water (0.01 M HCl) was added to the reaction flask within 4 min, while constantly stirring the reaction mixture using a magnetic stirrer. After this the reaction mixture was stirred at RT for 26 min and refluxed for 5 hours using electric mantel. After the refluxing, most of the acetone was removed from the reaction mixture using a rotary evaporator (pressure 400->200 mbar, t(bath)=50° C.). After most of the acetone was removed, 105 g of PGMEA was added to the flask. The reaction mixture was evaporated further in the rotary evaporator (pressure 45 mbar, t(bath)=50° C., 1 hour) after PGMEA addition to perform a solvent exchange. After the solvent exchange the material solution was refluxed at 120 C for 2 hours. After the 2 hour refluxing step the material is ready to use after dilution and filtration. The material was diluted (by adding PGMEA) to 20% solid content and filtrated using 0.1 µm PTFE filter.

EXAMPLE 5

The same composition as in Example 3 was produced on a larger scale reaction as follows:
Phenyltrimethoxysilane (80 g, 5 mol %), tetraethoxysilane (1340.5 g, 80 mol %) and Phenanthrene-9-triethoxysilane (412 g, 15 mol %) were weighed to a round bottom flask. 3665.0 g of acetone was added to the round bottom flask. 550.74 g of water (0.01 M HCl) was added to the reaction flask within 5 min, while constantly stirring the reaction mixture using a magnetic stirrer. After this the reaction mixture was stirred at RT for 27 min and refluxed for 5 hours using electric mantel. After the refluxing, most of the acetone was removed from the reaction mixture using a rotary evaporator (pressure 350->250 mbar, t(bath)=50° C.). After most of the acetone was removed, 600 g of PGMEA was added to the flask. The reaction mixture was evaporated further in the rotary evaporator (pressure 45 mbar, t(bath)=50° C., 1 hour) after PGMEA addition to perform a solvent exchange. After the solvent exchange the material solution was refluxed at 120 C for 2 hours. After the 2 hour refluxing step the material is ready to use after dilution and filtration. The material was diluted (by adding PGMEA) to 20% solid content and filtrated using 0.1 µm PTFE filter.

EXAMPLE 6

Phenyltrimethoxysilane (80 g, 5 mol %), tetraethoxysilane (1340.5 g, 80 mol %) and Phenanthrene-9-triethoxysilane (412 g, 15 mol %) were weighed to a round bottom flask. 3665.0 g of acetone was added to the round bottom flask. 550.74 g of water (0.01 M HCl) was added to the reaction flask within 5 min, while constantly stirring the reaction mixture using a magnetic stirrer. After this the reaction mixture was stirred at RT for 27 min and refluxed for 5 hours using electric mantel. After the refluxing, most of the acetone was removed from the reaction mixture using a rotary evaporator (pressure 350->250 mbar, t(bath)=50° C.). After most of the acetone was removed, 600 g of PGMEA was added to the flask. The reaction mixture was evaporated further in the rotary evaporator (pressure 45 mbar, t(bath)=50° C., 1 hour) after PGMEA addition to perform a solvent exchange. After the solvent exchange the material solution was refluxed at 120 C for 2 hours. After the 2 hour refluxing step the material is ready to use after dilution and filtration. The material was diluted (by adding PGMEA) to 25% solid content.

EXAMPLE 7

Phenyltrimethoxysilane (80 g, 5 mol %), tetraethoxysilane (1340.5 g, 80 mol %) and Phenanthrene-9-triethoxysilane (412 g, 15 mol %) were weighed to a round bottom flask. 3665.0 g of acetone was added to the round bottom flask. 550.74 g of water (0.01 M HCl) was added to the reaction flask within 5 min, while constantly stirring the reaction mixture using a magnetic stirrer. After this the reaction mixture was stirred at RT for 27 min and refluxed for 5 hours using electric mantel. After the refluxing, most of the acetone was removed from the reaction mixture using a rotary evaporator (pressure 350->250 mbar, t(bath)=50° C.). After most of the acetone was removed, 600 g of PGMEA was added to the flask. The reaction mixture was evaporated further in the rotary evaporator (pressure 45 mbar, t(bath)=50° C., 1 hour) after PGMEA addition to perform a solvent exchange. After the solvent exchange the material solution was refluxed at 120 C for 2 hours. After the 2 hour refluxing step the material is ready to use after dilution and filtration. The material was diluted (by adding PGMEA) to 20% solid content and filtrated using 0.1 μm PTFE filter. After adding the PGMEA the material solution was further diluted by PGME to result in 11% final solid content and 1:1 PGMEA:PGME solution.

EXAMPLE 8

Phenyltrimethoxysilane (13.10 g, 5 mol %), tetraethoxysilane (219.99 g, 80 mol %) and Phenanthrene-9-triethoxysilane (67.58 g, 15 mol %) were weighed to a round bottom flask. 300.66 g of PGME was added to the round bottom flask. 90.29 g of water (0.01 M HCl) was added to the reaction flask within 5 min, while constantly stirring the reaction mixture using a magnetic stirrer. After this the reaction mixture was stirred at RT for 15 min and refluxed for 5 hours using electric mantel. After refluxing a solvent exchange procedure was performed from PGME to PGME (203 g of PGME was added). After the solvent exchange the material solution was refluxed at 120 C for 2 hours. After the 2 hour refluxing step the material is ready to use after dilution and filtration. The material was diluted (by adding PGME) to 20% solid content and filtrated using 0.1 μm PTFE filter.

EXAMPLE 9

Phenyltrimethoxysilane (44.62 g, 15 mol %), tetraethoxysilane (250.00 g, 80 mol %) and Phenanthrene-9-triethoxysilane (25.62 g, 5 mol %) were weighed to a round bottom flask. 320.24 g of IPA/PGME mixture (1:1) was added to the round bottom flask. 102.60 g of water (0.01 M HCl) was added to the reaction flask within 5 min, while constantly stirring the reaction mixture using a magnetic stirrer. After this the reaction mixture was stirred at RT for 15 min and refluxed for 5 hours using electric mantel. After refluxing a solvent exchange procedure was performed from IPA/PGME mixture to PGME (200 g of PGME was added). After the solvent exchange the material solution was refluxed at 120 C for 2 hours. After refluxing the material is ready to use after dilution and filtration. The material was diluted (by adding PGME) to 20% solid content and filtrated using 0.1 μm PTFE filter.

EXAMPLE 10

Phenyltrimethoxysilane (25.05 g, 10 mol %), tetraethoxysilane (150.00 g, 57 mol %), Phenanthrene-9-triethoxysilane (12.95 g, 3 mol %) and methyltriethoxysilane (67.57 g, 30 mol %) were weighed to a round bottom flask. 255.57 g of PGME was added to the round bottom flask. 81.16 g of water (0.01 M HCl) was added to the reaction flask within 5 min, while constantly stirring the reaction mixture using a magnetic stirrer. After this the reaction mixture was stirred at RT for 15 min and refluxed for 5 hours using electric mantel. After refluxing a solvent exchange procedure was performed from PGME to PGME (200 g of PGME was added). After the solvent exchange the material solution was refluxed at 120 C for 2 hours. After refluxing the material is ready to use after dilution and filtration. The material was diluted (by adding PGME) to 20% solid content and filtrated using 0.1 μm PTFE filter.

EXAMPLE 11

Phenyltrimethoxysilane (28.43 g, 10 mol %), tetraethoxysilane (230.0 g, 77 mol %), Phenanthrene-9-triethoxysilane (14.69 g, 3 mol %) and triethoxysilane (23.55 g, 10 mol %) were weighed to a round bottom flask. 296.67 g of IPA/PGME mixture (1:1) was added to the round bottom flask. 97.25 g of water (0.01 M HCl) was added to the reaction flask within 5 min, while constantly stirring the reaction mixture using a magnetic stirrer. After this the reaction mixture was stirred at RT for 15 min and refluxed for 5 hours using electric mantel. After refluxing a solvent exchange procedure was performed from IPA/PGME mixture to PGME (202 g of PGME was added). After the solvent exchange the material solution was refluxed at 120 C for 2 hours. After refluxing step the material is ready to use after dilution and filtration. The material was diluted (by adding PGME) to 20% solid content and filtrated using 0.1 μm PTFE filter.

EXAMPLE 12

Phenyltrimethoxysilane (8.39 g, 5 mol %), tetraethoxysilane (140.86 g, 80 mol %) and Phenanthrene-9-triethoxysilane (43.27 g, 15 mol %) were weighed to a round bottom flask. 192.51 g of PGME was added to the round bottom flask. 57.81 g of water (0.01 M HCl) was added to the reaction flask within 5 min, while constantly stirring the reaction mixture using a magnetic stirrer. After this the reaction mixture was stirred at RT for 15 min and refluxed for 5 hours using electric mantel. After refluxing a solvent exchange procedure was performed from PGME to PGME (230 g of PGME was added). After the solvent exchange the material solution was refluxed at 120 C for 2 hours. After the 2 hour refluxing step the material is ready to use after dilution and filtration. The material was diluted (by adding PGME) to 20% solid content and filtrated using 0.1 µm PTFE filter. This solution was further diluted using PnP (Propylene glycol propyl ether) to result in 11% solution (1:1, PGME:PnP).

EXAMPLE 13

Phenyltrimethoxysilane (8.39 g, 5 mol %), tetraethoxysilane (140.86 g, 80 mol %) and Phenanthrene-9-triethoxysilane (43.27 g, 15 mol %) were weighed to a round bottom flask. 192.51 g of PGME was added to the round bottom flask. 57.81 g of water (0.01 M HCl) was added to the reaction flask within 5 min, while constantly stirring the reaction mixture using a magnetic stirrer. After this the reaction mixture was stirred at RT for 15 min and refluxed for 5 hours using electric mantel. After refluxing a solvent exchange procedure was performed from PGME to PGME (230 g of PGME was added). After the solvent exchange the material solution was refluxed at 120 C for 2 hours. After the 2 hour refluxing step the material is ready to use after dilution and filtration. The material was diluted (by adding PGME) to 20% solid content and filtrated using 0.1 µm PTFE filter. This solution was further diluted using NPA (n-propyl acetate) to result in 11% solution (1:1, PGME:NPA).

EXAMPLE 14

Phenyltrimethoxysilane (8.39 g, 5 mol %), tetraethoxysilane (140.86 g, 80 mol %) and Phenanthrene-9-triethoxysilane (43.27 g, 15 mol %) were weighed to a round bottom flask. 192.51 g of PGME was added to the round bottom flask. 57.81 g of water (0.01 M HCl) was added to the reaction flask within 5 min, while constantly stirring the reaction mixture using a magnetic stirrer. After this the reaction mixture was stirred at RT for 15 min and refluxed for 5 hours using electric mantel. After refluxing a solvent exchange procedure was performed from PGME to PGME (230 g of PGME was added). After the solvent exchange the material solution was refluxed at 120 C for 2 hours. After the 2 hour refluxing step the material is ready to use after dilution and filtration. The material was diluted (by adding PGME) to 20% solid content and filtrated using 0.1 µm PTFE filter. This solution was further diluted using NBA (n-butyl acetate) to result in 11% solution (1:1, PGME:NBA).

EXAMPLE 15

Phenyltrimethoxysilane (13.10 g, 5 mol %), tetraethoxysilane (220.00 g, 80 mol %) and Phenanthrene-9-triethoxysilane (67.58 g, 15 mol %) were weighed to a round bottom flask. 601.32 g of acetone was added to the round bottom flask. 90.29 g of water (0.01 M HCl) was added to the reaction flask within 5 min, while constantly stirring the reaction mixture using a magnetic stirrer. After this the reaction mixture was stirred at RT for 15 min and refluxed for 5 hours using electric mantel. After refluxing a solvent exchange procedure was performed from acetone to PGMEA (380 g of PGMEA was added). After the solvent exchange the material solution was refluxed at 120 C for 2 hours. After the 2 hour refluxing step the material is ready to use after dilution and filtration. The material was diluted (by adding PGMEA) to 20% solid content and filtrated using 0.1 µm PTFE filter. This solution was further diluted using PnP to result in 11% solution (1:1, PGME:PnP).

EXAMPLE 16

Phenyltrimethoxysilane (13.10 g, 5 mol %), tetraethoxysilane (220.00 g, 80 mol %) and Phenanthrene-9-triethoxysilane (67.58 g, 15 mol %) were weighed to a round bottom flask. 601.32 g of acetone was added to the round bottom flask. 90.29 g of water (0.01 M HCl) was added to the reaction flask within 5 min, while constantly stirring the reaction mixture using a magnetic stirrer. After this the reaction mixture was stirred at RT for 15 min and refluxed for 5 hours using electric mantel. After refluxing a solvent exchange procedure was performed from acetone to PGMEA (380 g of PGMEA was added). After the solvent exchange the material solution was refluxed at 120 C for 2 hours. After the 2 hour refluxing step the material is ready to use after dilution and filtration. The material was diluted (by adding PGMEA) to 20% solid content and filtrated using 0.1 µm PTFE filter. This solution was further diluted using NPA to result in 11% solution (1:1, PGME:NPA).

EXAMPLE 17

Phenyltrimethoxysilane (13.10 g, 5 mol %), tetraethoxysilane (220.00 g, 80 mol %) and Phenanthrene-9-triethoxysilane (67.58 g, 15 mol %) were weighed to a round bottom flask. 601.32 g of acetone was added to the round bottom flask. 90.29 g of water (0.01 M HCl) was added to the reaction flask within 5 min, while constantly stirring the reaction mixture using a magnetic stirrer. After this the reaction mixture was stirred at RT for 15 min and refluxed for 5 hours using electric mantel. After refluxing a solvent exchange procedure was performed from acetone to PGMEA (380 g of PGMEA was added). After the solvent exchange the material solution was refluxed at 120 C for 2 hours. After the 2 hour refluxing step the material is ready to use after dilution and filtration. The material was diluted (by adding PGMEA) to 20% solid content and filtrated using 0.1 µm PTFE filter. This solution was further diluted using NBA to result in 11% solution (1:1, PGME:NBA).

While the present invention has been illustrated and described with respect to a particular embodiment thereof, it should be appreciated by those of ordinary skill in the art that various modifications to this invention may be made without departing from the spirit and scope of the present invention.

What is claimed is:

1. A process for producing an organosiloxane polymer comprising
   hydrolyzing tri- and tetraalkoxysilane monomers in a hydrolysis step conducted in a reaction medium comprising a first organic solvent and a second organic solvent;
   polymerising said hydrolyzed monomers in a polymerization step by subjecting them to conditions conducive to polymerisation to form an organosiloxane polymer; and
   changing the second organic solvent for a third organic solvent after the hydrolysis step and before the polymerization step,
   wherein the first organic solvent is an organic compound having hydroxyl groups, and
   wherein the second organic solvent is selected from the group of aliphatic and aromatic hydrocarbons, aliphatic or aromatic ethers, aliphatic or aromatic esters and mixtures thereof.

2. The process according to claim 1, comprising producing an organosiloxane polymer containing at least 50 mole-% residues derived from tetraalkoxysilane monomers.

3. The process according to claim 1, wherein the reaction medium of the hydrolysis step comprises 5 to 95 mole-% of the organic compound containing hydroxyl groups.

4. The process according to claim 1, wherein the reaction medium comprises about 40 to 75 mole-% of the second organic solvent.

5. The process according to claim 1, wherein the reaction medium comprises 1 to 30 mole-% water.

6. The process according to claim 1, wherein the reaction medium comprises at least 50 mole-% of the second organic solvent, a minimum of 10 mole-% of the organic hydroxyl compound and a minimum of 10 mole-% water.

7. The process according to claim 1, wherein the second organic solvent is capable of dissolving the hydrolyzed monomer.

8. The process according to claim 1, wherein the organic hydroxy compound and the first organic solvent are miscible with each other.

9. The process according to claim 1, wherein the organic hydroxy compound is an alcohol having the formula $R^5$—OH wherein $R^5$ stands for
- a linear or branched or cyclic alkyl having 1 to 10 carbon atoms, said alkyl optionally being substituted with one or several hydroxy groups, halogen groups, thiol groups, carboxylic acid groups, and aryl groups; or
- an aryl group having 6 to 12 carbon atoms, which aryl group is optionally substituted with one or several hydroxy groups, halogen groups, thiol groups, carboxylic acid groups, and aryl groups.

10. The process according to claim 1, wherein water is removed before the polymerization step.

11. The process according to claim 1, wherein the reaction medium used in the hydrolysis step has a pH of less than 7, preferably less than 6, in particular less than 5.

12. The process according to claim 1, wherein the organic hydroxy compound is present both during the hydrolysis and the polymerization of the monomer.

13. The process according to claim 1, comprising recovering the organosiloxane polymer, wherein said polymer is recovered in the reaction medium.

14. The process according to claim 1, comprising recovering the organosiloxane polymer, wherein said polymer is formulated into a composition comprising at least about 20 mole-% of an organic hydroxyl compound.

15. The process according to claim 1, comprising hydrolyzing and polymerizing a monomer according to either or both of formulas I and II:

$$R^1_a SiX_{4-a} \quad\quad\quad\quad I$$

and $$R^2_b SiX_{4-b} \quad\quad\quad\quad II$$

wherein $R^1$ and $R^2$ are independently selected from the group consisting of hydrogen, linear and branched alkyl and cycloalkyl, alkenyl, alkynyl, (alk)acrylate, epoxy and alkoxy and aryl having 1 to 6 rings;
each X represents independently a hydrolysable group or a hydrocarbon residue; and
a and b is an integer 1 to 3.

16. The process according to claim 15, wherein the hydrolysable group is an alkoxy group.

17. The process according to claim 1, comprising using at least one monomer corresponding to Formula III:

$$R^3_c SiX_{4-c} \quad\quad\quad\quad III$$

wherein $R^3$ stands for hydrogen, alkyl or cycloalkyl which optionally carries one or several substituents, or alkoxy;
each X represents independently a hydrolysable group or a hydrocarbon residue having the same meaning as above; and
c is an integer 1 to 3.

18. The process according to claim 1, comprising using monomers selected from the group of triethoxysilane, tetraethoxysilane, methyltriethoxysilane, ethyltriethoxysilane, n-butyltriethoxysilane, methyldiethoxyvinylsilane, dimethyldiethoxysilane, phenyltrimethoxysilane, and phenantrene-9-triethoxysilane and mixtures thereof, at least 50 mole-% of the monomers being selected from the group of tetraethoxysilane, methyltriethoxysilane, ethyltriethoxysilane, n-butyltriethoxysilane, methyldiethoxyvinylsilane and dimethyldiethoxysilane and mixtures thereof.

19. The process according to claim 1, comprising using tetraalkoxysilane as a monomer, wherein said alkoxy groups of the silane being identical or different and selected from the group of radicals having the formula —O—$R^4$, wherein $R^4$ stands for a linear or branched alkyl group having 1 to 10, preferably 1 to 6 carbon atoms, and optionally exhibiting one or two substitutens selected from the group of halogen, hydroxyl, vinyl, epoxy and allyl.

20. The process according to claim 1, wherein the organic hydroxyl compound is selected from the group of primary, secondary and tertiary alcohols.

21. The process according to claim 1, wherein the silicon content of the organosiloxane polymer is at least 20 mole-%, preferably at least 25 mole-%, in particular at least 30 mole-%, suitably at least 35 mole-%, advantageously even 40 mole-% or more.

22. The process according to claim 1, wherein the step of polymerising comprises condensing the hydrolyzed monomers to yield a prepolymer, applying the prepolymer to a substrate and polymerising the prepolymer to form a film.

23. The process according to claim 22, further comprising the step of curing the film.

* * * * *